United States Patent [19]

Smith et al.

[11] Patent Number: 4,706,744

[45] Date of Patent: Nov. 17, 1987

[54] WIRELINE TOOL CONNECTOR

[75] Inventors: Lonnie J. Smith, Allen; Steven G. Petermann; Dennis R. Wood, both of Plano, all of Tex.

[73] Assignee: Atlantic Richfield Company, Los Angeles, Calif.

[21] Appl. No.: 899,443

[22] Filed: Aug. 22, 1986

[51] Int. Cl.[4] ...................... E21B 47/00; F16L 27/12; H02G 9/06

[52] U.S. Cl. ................................ 166/65.1; 174/99 E; 174/100; 285/3; 285/302

[58] Field of Search ...................... 166/65.1, 384, 385, 166/77, 66.4; 285/3, 302, 298; 174/73 R, 69, 99 R, 99 E, 100

[56] References Cited

U.S. PATENT DOCUMENTS

| | | | |
|---|---|---|---|
| 2,187,007 | 1/1940 | Barnes | 166/65.1 X |
| 2,620,029 | 12/1952 | Turechek et al. | 166/65.1 X |
| 3,024,844 | 3/1962 | Hanes | 166/65.1 X |
| 3,957,118 | 5/1976 | Barry et al. | 166/385 |
| 4,098,342 | 7/1978 | Robinson et al. | 166/385 |
| 4,624,308 | 11/1986 | White | 166/65.1 |

*Primary Examiner*—Stephen J. Novosad

*Attorney, Agent, or Firm*—Michael E. Martin

[57] ABSTRACT

A connector for attaching a downhole tool to the end of a tubing string insertable in a wellbore includes a frangible coupling portion having a pin with a predetermined cross sectional area which will fail in tension to separate the connector from the tool if the tool becomes stuck in the wellbore. The pin is disposed in a body member of the connector and interconnected therewith by spring washers to absorb transient shock or impact loads on the tool. The connector includes passages for extending electrical conductors through the coupling portion whereby electrical signals may be transmitted through the tubing string to the downhole tool.

19 Claims, 2 Drawing Figures

WIRELINE TOOL CONNECTOR

BACKGROUND OF THE INVENTION

1. Field of the Invention

The present invention pertains to an improved wireline tool connector for interconnecting a downhole tool with a tubing string having an electrical conductor or wireline cable extending therethrough.

2. Background

In operations in wellbores for producing hydrocarbon fluids and other values, difficulties arise in positioning and operating certain types of downhole tools. Various types of electrically operated downhole tools such as logging sondes and perforating tools are sometimes preferably positioned in the wellbore utilizing elongated bendable metal tubing, referred to in the art as coiled or coilable tubing, having an electrical cable or wireline extending therethrough.

However, certain problems arise with respect to extending the electrical cable within the bendable tubing to a connection point with the tool while also providing a suitable connector between the tool and the tubing string. In this regard, certain improvements have been made in apparatus and methods for operating wireline tools in wellbores such as disclosed in U.S. patent application Ser. No. 820,851, filed Jan. 21, 1986, and assigned to the assignee of the present invention.

The present invention provides further improvements in connector devices of the general type discussed herein and disclosed and claimed in the above referenced patent application which overcome certain problems in providing a connector having a separable or frangible coupling portion.

SUMMARY OF THE INVENTION

The present invention provides an improved connector apparatus for interconnecting a subsurface or so called downhole well tool with an elongated tubing string and wherein electrical conductors extend through the tubing string and the connector to the tool itself.

In accordance with one aspect of the present invention, a subsurface connector for interconnecting a wireline or other electrical tool with a tubing string is provided wherein a frangible coupling is included in the connector for separating part of the connector from the tool in the event the tool becomes stuck in the wellbore. The improved frangible coupling is adapted to absorb axially directed shocks or impact loads such as recoil forces exerted on the connector by the actuation of perforating tools and the like.

The improved connector also provides for separating the connector at a point which will expose a portion of the connector still connected to the subsurface tool to a fishing tool, for retrieval of the subsurface tool and the still attached connector portion.

In accordance with another aspect of the present invention, there is provided an improved connector for interconnecting an electrically operated tool with a tubing string wherein electrical conductors extend through the tubing string and through the connector member, including a frangible coupling portion, for conducting electrical signals between the subsurface tool and the surface or a point uphole from the tool.

The present invention also provides an improved connector for interconnecting a tubing string with a downhole tool which includes improved means for anchoring a sheathed cable such as a conventional wireline cable to eliminate parting of the cable sheath itself and so that only the relatively small diameter flexible conductors will separate in the event of separation of the connector at its frangible coupling. In this way, the wireline cable is less likely to part at a point which would interfere with retrieval operations for the connector and the downhole tool in the event that the latter becomes stuck in the wellbore.

The abovementioned features and advantages of the present invention, together with other superior aspects thereof, are described in further detail herein. These features and advantages will be further appreciated by those skilled in the art upon reading the detailed description which follows in conjunction with the drawing.

BRIEF DESCRIPTION OF THE DRAWINGS

FIG. 1 is a view illustrating the use of the connector of the present invention for supporting a downhole well tool at the end of tubing string or the like.

DESCRIPTION OF A PREFERRED EMBODIMENT

Figure 1:
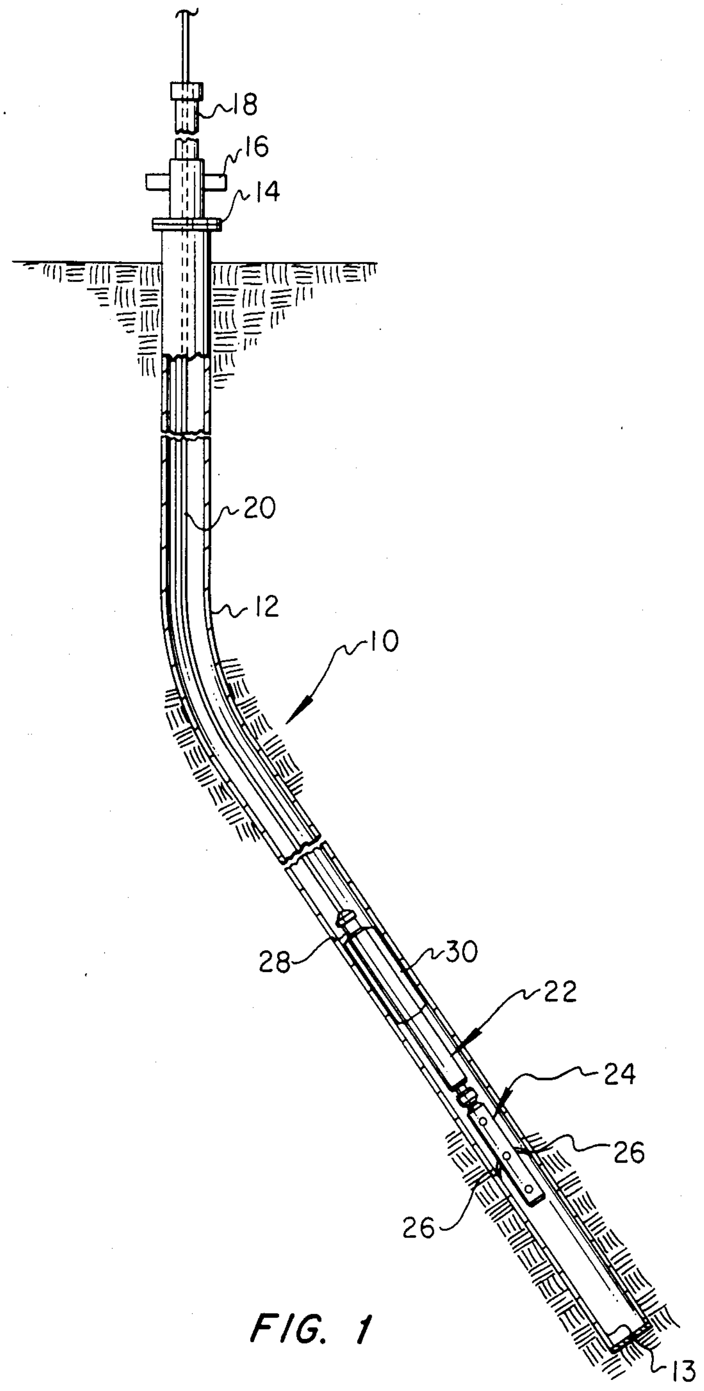

In the description which follows, like parts are marked throughout the specification and drawing with the same reference numerals, respectively. The drawing figures are not necessarily to scale and certain features of the invention may be shown exaggerated in scale in the interest of clarity and conciseness.

Referring to FIG. 1, there is illustrated a typical deviated wellbore, generally designated by the numeral 10, which is provided with a casing 12. In the illustrated example of the wellbore 10 the casing 12 extends to the bottom 13 of the wellbore although the wellbore may include an open or uncased lower portion. The casing 12 extends to a wellhead 14 which may be provided with a conventional blowout preventer 16 and a wireline lubricator 18. An elongated tubing string 20 extends through the lubricator 18 and into the wellbore and terminates at its lower end in a connector in accordance with the present invention and generally designated by the numeral 22.

The connector 22 interconnects the tubing string 20 with a tool 24 which may be a conventional casing perforating gun, a logging sonde, or other type of subsurface or downhole tool. The tool 24 may include centering means 26 of conventional construction for centering the tool in the wellbore. The connector 22 includes an upper body member 28 which is coupled directly to the tubing string 20 and is journaled by a centralizer, generally designated by the numeral 30. The centralizer 30 may be of conventional construction or of the type described in the above referenced copending patent application.

The tubing string 20 may comprise an elongated section of bendable metal tubing which extends from the connector 22 through the wireline lubricator 18 and may be operated to be injected into and removed from the well 10 by a suitable coiled tubing injection unit, not shown. The tubing string 20 may also be made up of end to end coupled tube sections and is not required to be constructed of metal since certain plastic materials or non-metallic composites may also be used as the structural material for the tubing string.

Figure 2:
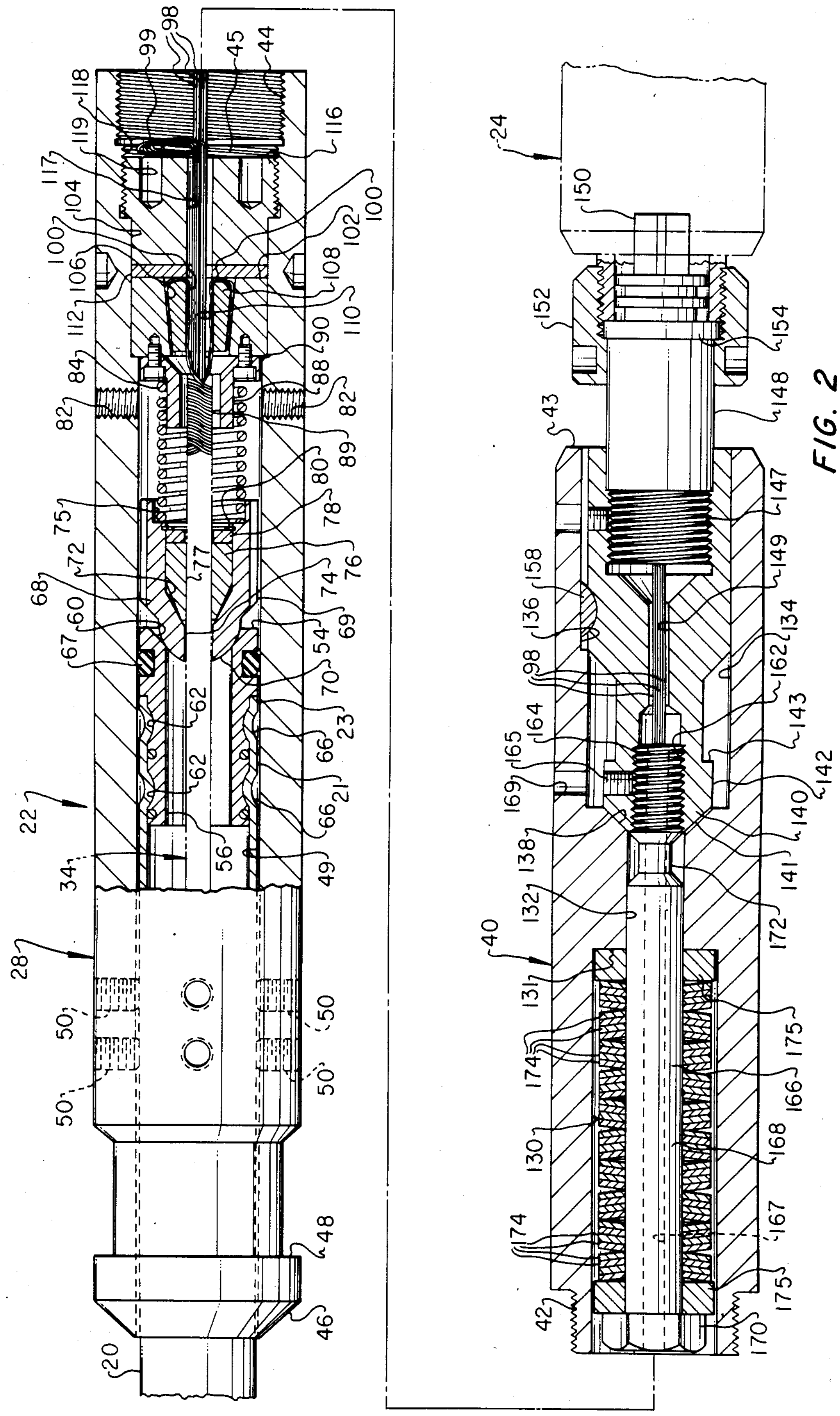
FIG. 2 is a longitudinal central section view of the connector.

Referring to FIG. 2, the tubing string 20 includes an elongated electrical cable extending therethrough and generally designated by the numeral 34. The cable 34 is adapted to be connected to a suitable control apparatus, not shown, on the surface and to extend through the tubing string 20 and the connector 22 to the tool 24 for transmitting electrical signals between the control apparatus and the tool. In FIG. 2 the connector 22 is illustrated in longitudinal section with the centralizer 30 removed from the body member 28. The connector 22 includes a lower body member 40 which is adapted to be removably connected to the upper body member 28 by a reduced diameter threaded portion 42 which is operable to be threadedly inserted in an internally threaded bore 44 formed in the body member 28. The terms upper and lower mentioned herein are for convenience only and refer to the relative locations of the respective members so designated when the connector 22 is inserted in a generally vertically extending wellbore. The upper end of the connector body 28 includes a fishing neck comprising a generally conical surface 46 and an annular transverse shoulder 48 whereby, in the unlikely event that the connector is separated from the tubing string 20, a fishing tool may be lowered into the wellbore to engage the body member 28.

The body member 28 is an elongated generally cylindrical member having a bore 49 extending therethrough and adapted to receive the lower end 21 of the tubing string 20. The tubing string 20 is typically secured to the body member 28 by a plurality of axially spaced apart radially extending setscrews 50 which are threadedly engaged with the body member 28 and forcibly engage the tubing end portion 21. The very distal end 23 of the tubing portion 21 is coupled to a member comprising a valve seat 54 having a longitudinal fluid passage or bore 56 formed therein. The seat member 54 includes a valve seat surface 60 of somewhat spherical or frustoconical shape. The seat member 54 also includes spaced apart annular recesses or grooves 62 for receiving radially inwardly displaced portions 66 of the tubing end 23 whereby the tubing string 20 is secured to the seat member 54. A fluid seal is formed by an o-ring 67 disposed in a suitable annular groove formed in the seat member 54 and engagable with the wall defining the bore 49 in the body member 28.

The connector 22 advantageously includes a one-way valve closure member 68 having a generally hemispherical head portion 70 and a partially frustoconical shaped central passage 72. The closure member 68 includes a longitudinal bore 74 formed in the head 70 and opening into the passage 72. The bore 74 is adapted to receive suitable packing or seal means comprising a member 76 disposed in the bore 72 and retained therein by a support ring or washer 78 and a removable retaining ring 80. The seal member 76 may be formed of a suitable resilient material such as molded polyurethane and includes a bore 77 formed therein which is adapted to be aligned with the bore 74 formed in the closure member 68. The closure member 68 includes generally radially extending, circumferentially spaced apart guides 69, two shown in FIG. 2, for guiding the closure member for axial movement in the bore 49 while permitting the flow of fluids from the bore 56 past the closure member and out of the connector body 28 through a plurality of threaded passages 82. The closure member 68 is biased into engagement with the valve seat member 54 by a coil spring 84 which has one end disposed in a recess 75 formed in the closure member 68 and the other end guided on a spigot 88 formed on a removable retainer plate 90 also adapted to be disposed in the bore 49.

As illustrated in FIG. 2, the cable 34 extends through the tubing end 23, the bores 56 and 74 and the bore 77 formed in the seal member 76. The cable 34 may be a conventional multiple conductor cable also commonly known as a wireline cable having a plurality of insulated electrical conductors 98 disposed in a sheath which may include plural layers of wound or braided steel wire 100 or other suitable elongated filaments. The cable 34 extends through a bore 89 formed in the retainer member 88. The cable 34 is anchored in the body member 28 by anchor means comprising a generally cylindrical anchor body 102 which is disposed in an enlarged bore portion 104 coaxial with the bore 49. The anchor body 102 includes a generally frustoconical central bore 106 which is adapted to receive a frustoconical shaped anchor plug 108. The plug 108 includes a suitable central bore 110 formed therein through which the conductors 98 and unwound sheath wires 100 are extended.

The cable sheath wires 100 are preferably bent over and trapped between the exterior surface of the anchor plug 108 and the bore 106 in the anchor body 102 and retained therein by a cylindrical retainer plate 112 which is forcibly engagable with the sheath wires and the anchor plug to force the plug ever tighter into the bore to clamp the wires as illustrated. The retainer plate 112, the anchor body 102 and the anchor plug 108 are secured in assembly and in the bore 104 by a retaining plug 116 which is threadedly engaged with an internally threaded portion 118 of the connector body 28. The plug 116 may include suitable recesses 119 for receiving the lugs of a suitable spanner wrench, not shown, for securing the plug in the connector body 28, as illustrated. The plug 116 also includes a central bore 117 through which the conductors 98 may extend to the lower connector body 40.

The connector body 40 includes a first longitudinal bore 130 extending from the threaded portion 42, a reduced diameter bore 132 and an enlarged bore portion 134 which extends from the bore 132 to the opposite end of the lower connector body 40. A longitudinal keyway 136 extends partially into the bore 134 from the end 43 of the body 40 opposite the threaded portion 42. A somewhat frustoconical shaped surface 138 is interposed between the bores 132 and 134 for seating a fishing head 140 of a coupling member 142. The head 140 includes a conical surface 141 and a transverse annular shoulder 143 for engagement with a suitable fishing tool, not shown, to retrieve the coupling member 142 and the tool 24 connected thereto. The bore 134 includes an internally threaded portion 147 for receiving a cable connector body 148 threadedly engaged therewith.

The cable connector body 148 includes a suitable multiconductor plug 150 which is adapted to couple the conductors 98 electrically to suitable signal transmitting or receiving apparatus, not shown, within the tool 24. The cable connector body 148 is threadedly coupled to the tool 24 by a nut 152 which is retained on the body 148 by an annular shoulder 154. Accordingly, the conductors 98 may extend through a bore 149 in the coupling member 142, into and through the cable connector body 148 and be suitably terminated at the plug 150. The coupling member 142 includes a suitable keyseat for receiving a Woodruff key 158 which is also disposed in the keyway 136. The arrangement of the key 158 interconnecting the coupling member 142 with the connector body 40 prevents rotation of the coupling member 142 relative to the connector body 40 which may be of importance in rotationally orienting certain downhole tools connected to the tubing string 20, for example. Moreover, unrestrained rotation of the connector body 148 relative to the connector 22 could damage the conductors 98.

The coupling member 142 is part of a unique frangible coupling interconnecting the connector 22 with the tool 24. The head 140 is provided with an internally threaded passage 162 for receiving a threaded end portion 164 of an elongated coupling pin 166. The threaded portion 164 is locked to the coupling member 142 by a suitable set screw 165 which is accessible through an opening 169. The pin 166 includes a shank portion 168 and a hexagonal cross section head 170. The coupling pin 166 includes a reduced diameter portion 172 interconnecting the threaded end portion 164 with the shank 168 and having a predetermined cross sectional area which will cause the shank 168 to separate from the threaded portion 164 in response to a predetermined tension load being exerted on the connector 22 by the tubing string 20, for example. The pin 166 includes a longitudinal bore 167 extending therethrough for passage of the conductors 98. The pin 166 is slidable in the bore 132 and closely fitted therein and is retained in the body 40 by resilient means comprising a plurality of stacked conical spring washers 174, sometimes referred to as Belleville washers, interposed between the head 170 and a transverse surface 131 delimiting the bore 130. Suitable retaining washers 175 are disposed between the head 170 and the surface 131 and at opposite ends of the stack of spring washers. The spring washers 174 are preloaded to a predetermined degree upon assembly of the pin 166 to the coupling member 142 to minimize unwanted axial excursions of the tool 24 relative to the connector 22.

Thanks to the provision of the resilient spring washers 174 interposed between the coupling pin 166 and the connector body 40 axial movement of the assembly of the tool 24, the body 148, the coupling member 142 and the pin 166 may occur relative to the connector body assembly, comprising the body members 28 and 40, and the tubing string 20 for absorbing any sudden axial loads such as might occur in response to axial recoil forces resulting from detonation of wellbore perforation charges and the like. Moreover, in the event that the tool 24 should become stuck in the wellbore, and upon exercise of a sufficient upward pulling force on the tubing string 20, the pin shank 168 will separate from the threaded portion 164 whereby the connector body 40 will separate from the coupling member 142 and that portion of the connector comprising the body members 28 and 40 will be retrieved from the wellbore leaving the fishing head 140 exposed for engagement with a suitable fishing tool.

Separation of the connector 22 as described above will typically result in parting of the conductors 98 at some point between the anchor body 102 and the connector body 148. This relatively short length of exposed, relatively small diameter and flexible conductors 98 will generally not interfere with manuevering a fishing tool into engagement with the head 140 so that the coupling member 142 and the tool 24 can be retrieved by conventional fishing techniques. The so-called weak point formed in the connector 22 by the aforementioned frangible coupling is adapted to separate at an axial force lower than would cause separation of the tubing string 20 and the wireline cable sheath. Accordingly, in the event that the tool 24 becomes stuck in the wellbore, the tubing string 20 and a major portion of the connector 22 may be retrieved to permit insertion of a fishing tool for engagement with the coupling member 142. In the relatively unlikely event that the tubing string 20 would separate from the connector body 28, the fishing head 46 is also operable to retrieve the connector 22 and the tool 24.

The separable body members 28 and 40 also provide for ease of assembly of the connector body 28 to the wireline cable 34 for anchoring the cable in the connector body and relieving any axial strain on the conductors 98. A loop 99 should be provided in the conductors 98 and housed in the space 45 to permit assembly of the body members 28 and 40 without stressing the conductors. The retainer plug 116 and the valve closure member 68 may be easily removed for servicing and repair and the anchoring means formed by the body 102 and the plug 108 may also be easily accessed for initially anchoring the wireline cable 34 to the connector 22. The abovedescribed connector 22 is still advantageously arranged to permit extension of the electrical conductors 98 through the connector while still providing for a frangible coupling between the tool 24 and the connector 22.

The operation of the connector is believed to be readily understandable to those skilled in the art from the foregoing description of its structural features. Conventional engineering metals and elastomeric materials may be used in constructing the connector 22.

Although a preferred embodiment of the invention has been described in detail herein, those skilled in the art will recognize that various substitutions and modifications may be made to the specific embodiment disclosed without departing from the scope and spirit of the invention as recited in the appended claims.

What we claim is:

1. A connector for interconnecting a downhole tool adapted to be disposed in a wellbore with an elongated tubing string, said tubing string including an elongated signal transmitting cable extending therein for transmitting signals between said tool and the earth's surface, said connector comprising:

an elongated body member connected at one end to said tubing string, said body member including means forming a bore through which said cable extends;

means on said connector for anchoring a portion of said cable relative to said body member; and frangible coupling means operably connected to said body member and to said tool and responsive to an axial pulling force on said tubing string to separate said connector from said tool at a predetermined force exerted on said coupling means, said coupling means including separable members adapted to provide for extension of signal conductors of said cable through said frangible coupling means to said tool.

2. The connector set forth in claim 1 wherein:

said coupling means includes an elongated pin having a reduced diameter portion, said pin being supported in said body member, and a coupling member connected to said pin and adapted to be connected to said tool and separable from said pin in response to an axial pulling force on said pin.

3. The connector set forth in claim 2 wherein:

said coupling member includes means formed thereon for engagement with a retrieving tool for retrieving said coupling member and said tool from a wellbore or the like.

4. The connector set forth in claim 1 including:

means interposed between said coupling means and said body member providing for elastic displacement of said coupling means relative to said body member to absorb impact or shock forces exerted on said tool relative to said connector.

5. The connector set forth in claim 4 wherein:

said means providing for elastic displacement includes resilient spring means interposed between one of said coupling members and said body member.

6. The connector set forth in claim 5 wherein:

said one coupling member includes a pin having passage means therein for receiving said conductors, said pin having a head portion engagable with said elastic means for retaining said elastic means between said pin and said body member.

7. The connector set forth in claim 6 wherein:

said pin is threadedly connected to another member of said coupling means for retaining said coupling means disposed in a bore formed in said body member.

8. The connector set forth in claim 7 wherein:

said other coupling member is disposed in said bore for axial sliding movement relative to said connector body and said connector includes means for preventing substantial rotation of said other coupling member relative to said connector body.

9. The connector set forth in claim 1 wherein:

said body member includes a first connector body member and a second connector body member being removably coupled to each other.

10. The connector set forth in claim 9 including:

anchor means for anchoring a load bearing portion of said cable to said first body member whereby said conductors extend through said connector in substantial relief of any axially directed forces exerted thereon.

11. The connector set forth in claim 10 wherein:

said anchor means includes a member having a conical bore, a conical plug insertable in said conical bore for forcibly engaging a plurality of filaments comprising said load bearing portion of said cable, and means engaged with said first body member for retaining said plug in said conical bore.

12. A connector for interconnecting a downhole tool adapted to be disposed in a wellbore with an elongated tubing string, said tubing string including an elongated signal transmitting cable extending therein for transmitting signals between said tool and the earth's surface, said connector comprising:

an elongated body connected at one end to said tubing string, said body including passage means through which at least a portion of said cable extends; and frangible coupling means operably connected to said body and to said tool and responsive to an axial pulling force on said tubing string to separate said connector from said tool at a predetermined force exerted on said coupling means, said coupling means including at least two members connected to each other and adapted to provide for extension of signal conductors of said cable through said frangible coupling means to said tool, one of said coupling members comprising frangible pin means having passage means therein for receiving said conductors, said pin means being connected to another coupling member, and said other coupling member including means for engagement with a retrieving tool for retrieving said tool and said other coupling member from a wellbore upon separation of said coupling means at said pin means.

13. The connector set forth in claim 12 wherein:

said other coupling member is disposed in said bore for axial sliding movement relative to said body and said connector includes means for preventing substantial rotation of said other coupling member relative to said body.

14. The connector set forth in claim 12 wherein:

said body includes a first connector body member and a second connector body member being removably coupled to each other.

15. The connector set forth in claim 12 including:

means interposed between one of said coupling members and said body providing for elastic displacement of said coupling means relative to said body to absorb shock forces exerted on said tool relative to said connector.

16. The connector set forth in claim 15 wherein:

said means providing for elastic displacement includes resilient spring means interposed between said pin means and said body.

17. A connector for interconnecting a downhole tool adapted to be disposed in a wellbore with an elongated tubing string, said tubing string including an elongated signal transmitting cable including plural signal conductors extending within said tubing string, said connector comprising:

an elongated body connected at one end to said tubing string, said body including passage means through which at least a portion of said cable extends;

coupling means connected to said body and to a downhole tool, said coupling means including separable members providing passage means for extension of said signal conductors of said cable through said coupling means to said tool; and means interposed between said coupling means and said body providing for elastic displacement of said coupling means relative to said body to absorb shock forces exerted on said tool relative to said connector.

18. The connector set forth in claim 17 wherein:

said means providing for elastic displacement includes resilient spring means interposed between one of said coupling members and said body.

19. The connector set forth in claim 18 wherein:

said one coupling member includes a frangible pin adapted to separate at a predetermined pulling force exerted on said tool through said tubing string, said pin having passage means therein for receiving said signal conductors, said pin having a portion engageable with said spring means for retaining said spring means between said pin and said body, and said pin is connected to another member of said coupling means for retaining said coupling means disposed in said body.

* * * * *